United States Patent
Chang

(10) Patent No.: US 7,318,252 B2
(45) Date of Patent: Jan. 15, 2008

(54) SPRING HINGE FOR GLASSES

(75) Inventor: Lien Fon Chang, Taipei (TW)

(73) Assignees: OBE Ohnmacht & Baumgartner GmbH & Co. (DE); Ching Lan (TW)

(*) Notice: Subject to any disclaimer, the term of this patent is extended or adjusted under 35 U.S.C. 154(b) by 157 days.

(21) Appl. No.: 10/505,274

(22) PCT Filed: Feb. 14, 2003

(86) PCT No.: PCT/EP03/01489

§ 371 (c)(1),
(2), (4) Date: Dec. 2, 2004

(87) PCT Pub. No.: WO03/071338

PCT Pub. Date: Aug. 28, 2003

(65) Prior Publication Data

US 2005/0086768 A1    Apr. 28, 2005

(30) Foreign Application Priority Data

Feb. 22, 2002 (DE) ................... 102 08 584
Jul. 19, 2002 (DE) ................... 102 34 209

(51) Int. Cl.
*G02C 5/22* (2006.01)
(52) U.S. Cl. ....................................... 16/228
(58) Field of Classification Search ............ 16/228; 351/63, 119, 153, 111, 113, 121, 114, 140
See application file for complete search history.

(56) References Cited

U.S. PATENT DOCUMENTS

| | | | |
|---|---|---|---|
| 4,674,147 A * | 6/1987 | Drlik | 16/228 |
| 4,747,183 A * | 5/1988 | Drlik | 16/228 |
| 4,991,258 A | 2/1991 | Drlik | |
| 5,018,242 A * | 5/1991 | Guy et al. | 16/228 |
| 5,406,339 A * | 4/1995 | Chen | 351/153 |
| 5,755,010 A * | 5/1998 | Lehnert | 16/228 |
| 6,241,354 B1 * | 6/2001 | Schuchard et al. | 351/113 |
| 6,353,965 B1 * | 3/2002 | Lo | 16/228 |
| 6,390,620 B1 * | 5/2002 | Montalban | 351/114 |
| 6,952,859 B2 * | 10/2005 | Wagner | 16/228 |

(Continued)

FOREIGN PATENT DOCUMENTS

CH    693831 A5 *    2/2004

(Continued)

OTHER PUBLICATIONS

International Search Report dated May 12, 2003.

(Continued)

*Primary Examiner*—Chuck Y. Mah
(74) *Attorney, Agent, or Firm*—Ostrolenk, Faber, Gerb & Soffen, LLP

(57) ABSTRACT

A spring hinge for eyeglasses: the glasses including a central part and side pieces, a hinge element comprising at least one hinge eyelet, a spring device interacting with the hinge element, a housing containing a cavity which at least partially accommodates the spring device and the hinge element. The hinge element is arranged in a displaceable manner within the housing. A guide region for the hinge element, and at least one section of the guide region can be arranged outside the cavity.

12 Claims, 8 Drawing Sheets

U.S. PATENT DOCUMENTS

2004/0237258 A1* 12/2004 Montagner .................. 16/228
2006/0126012 A1* 6/2006 Fiehn ........................ 351/153
2006/0179609 A1* 8/2006 Huang ........................ 16/228

FOREIGN PATENT DOCUMENTS

| | | |
|---|---|---|
| DE | 2052 268 | 4/1972 |
| DE | G 91 14 917.7 | 5/1993 |
| DE | 93 06 387 | 7/1993 |
| DE | 195 15 495 A1 | 10/1996 |
| DE | 694 08 348 T2 | 8/1998 |
| EP | 0 326 194 | 8/1989 |
| EP | 0 003 928 | 9/1994 |
| EP | 0 615 149 | 9/1994 |
| EP | 632306 A1 * | 1/1995 |
| EP | 0 639 785 A1 | 2/1995 |
| EP | 1 059 552 | 12/2000 |
| EP | 1617276 A * | 1/2006 |
| FR | 2609816 A1 * | 7/1988 |
| FR | 2 793 323 | 11/2000 |
| GB | 2248121 A * | 3/1992 |
| WO | 97 45764 | 12/1997 |
| WO | 01 04689 | 1/2001 |

OTHER PUBLICATIONS

International Preliminary Examination Report dated Sep. 19, 2003.
German Office Action dated May 19, 2006.

* cited by examiner

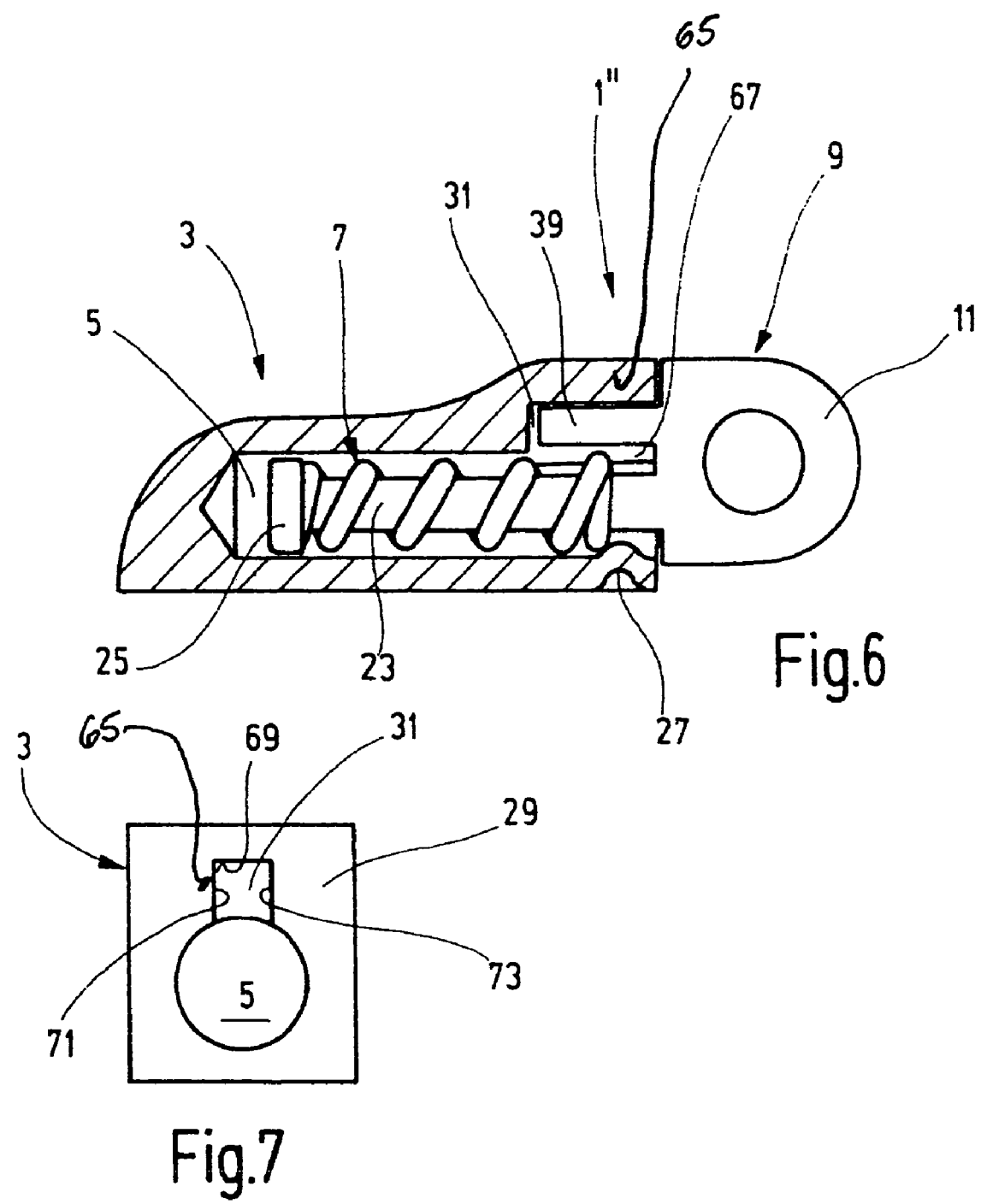

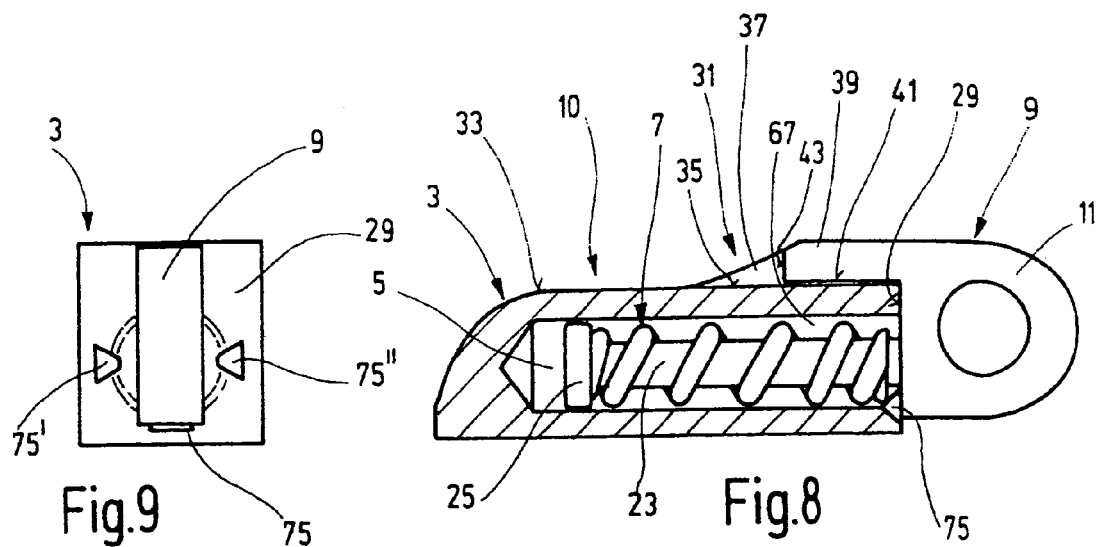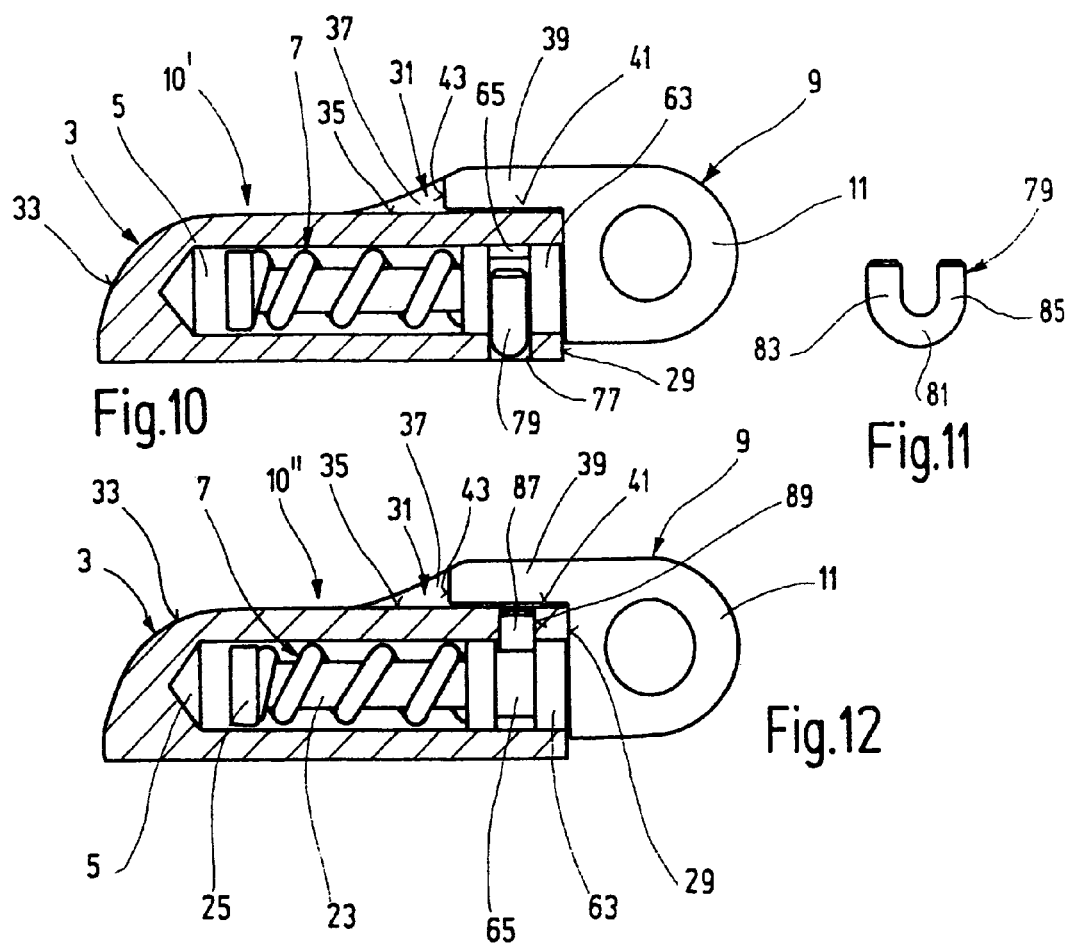

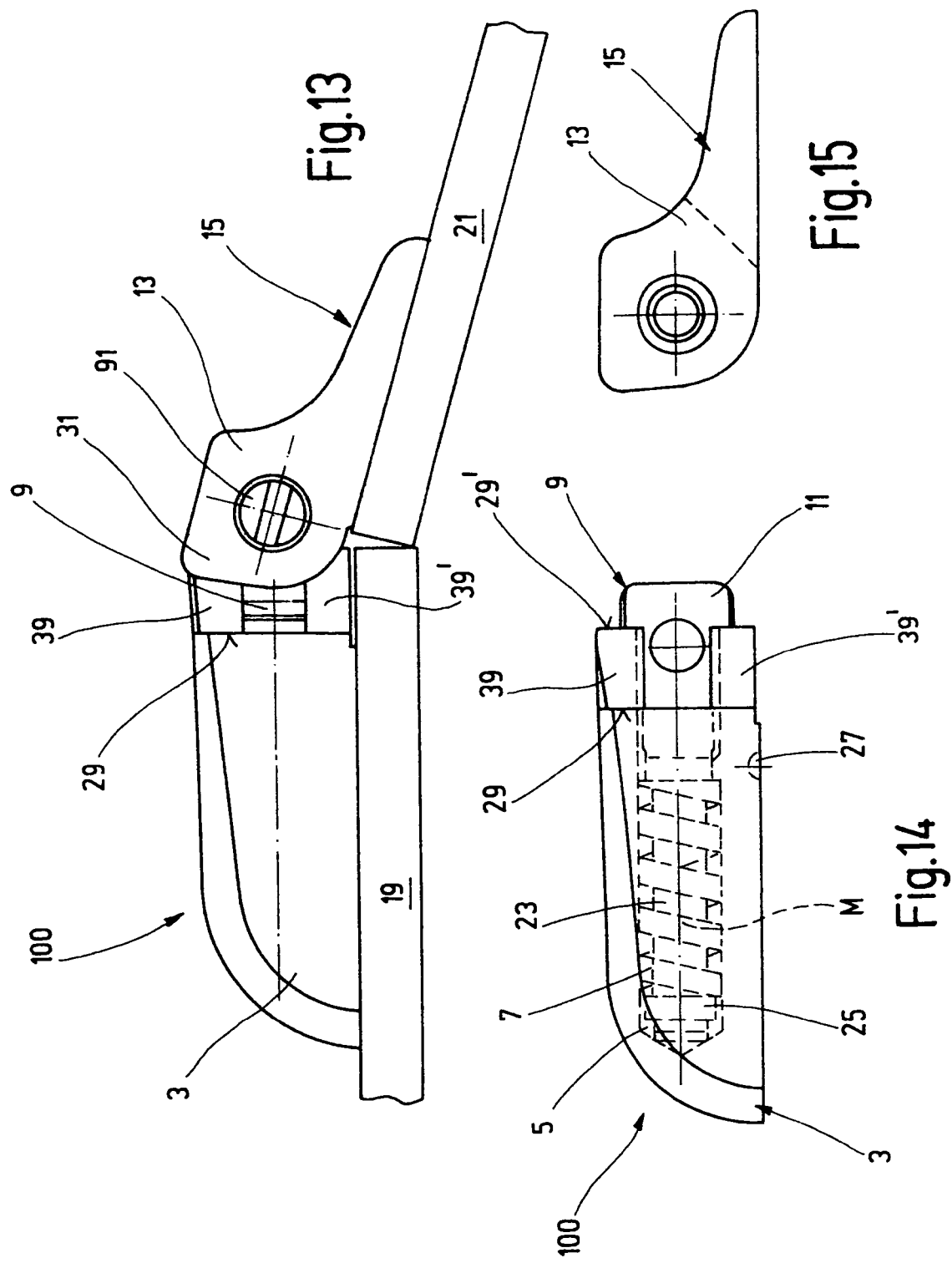

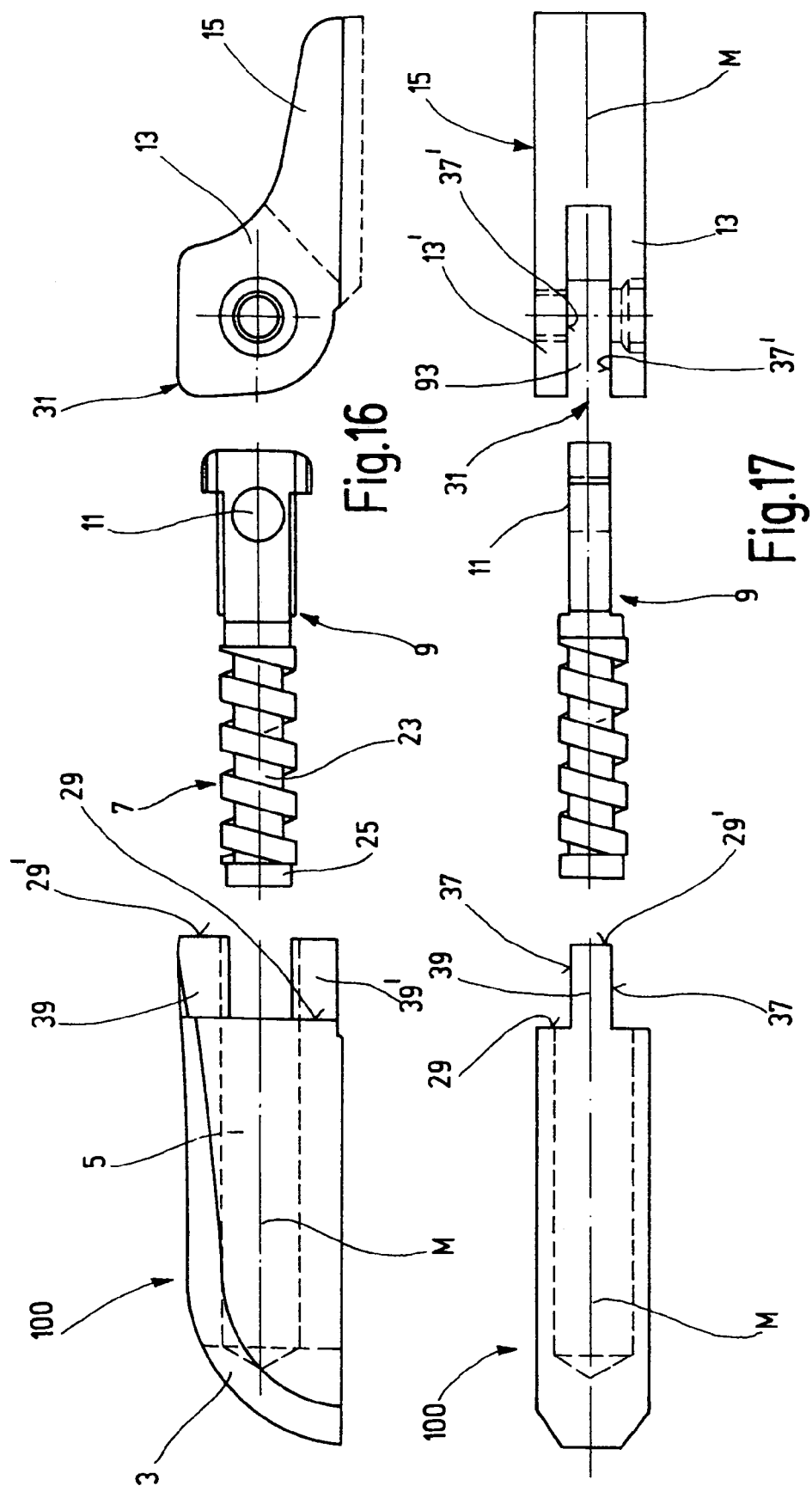

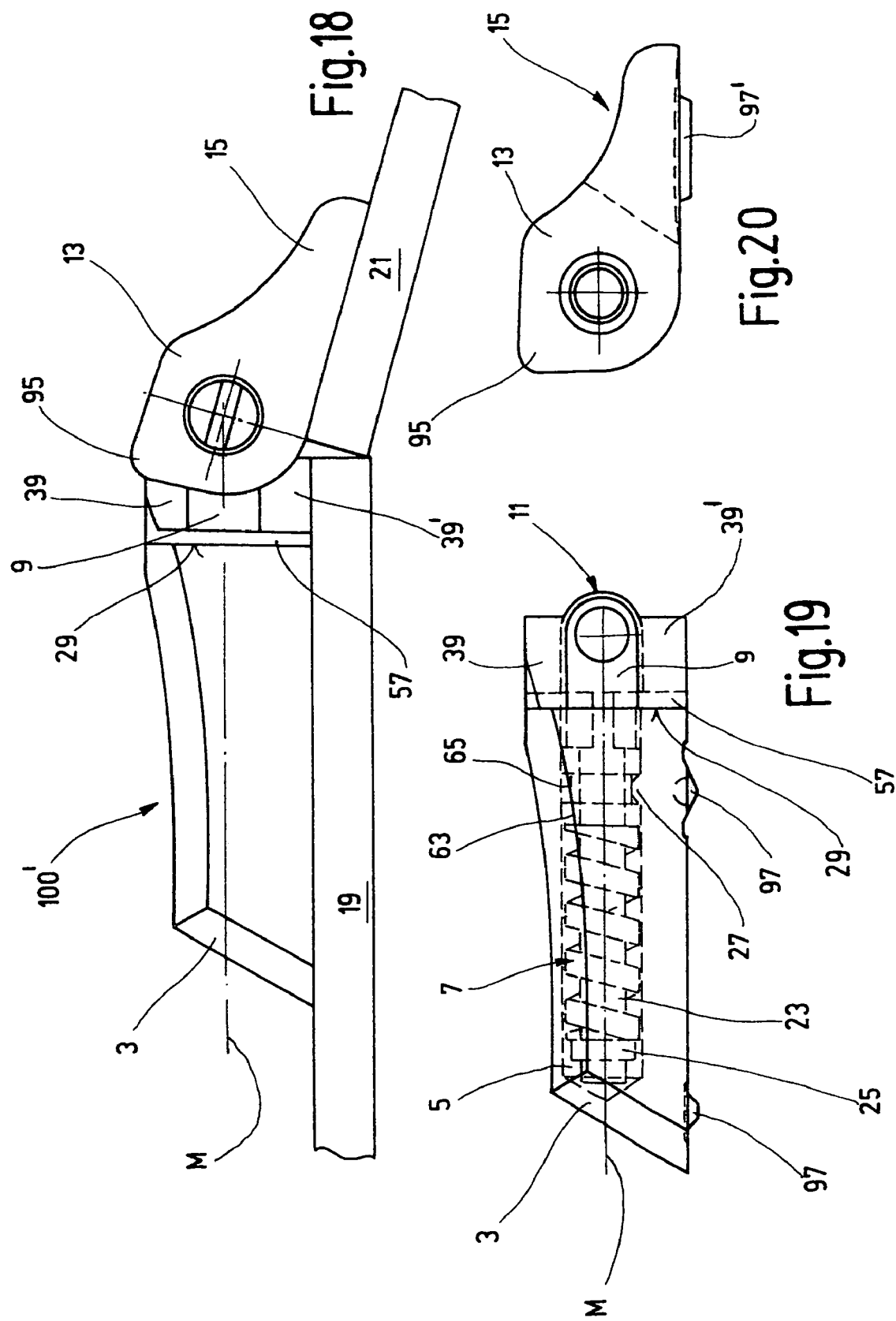

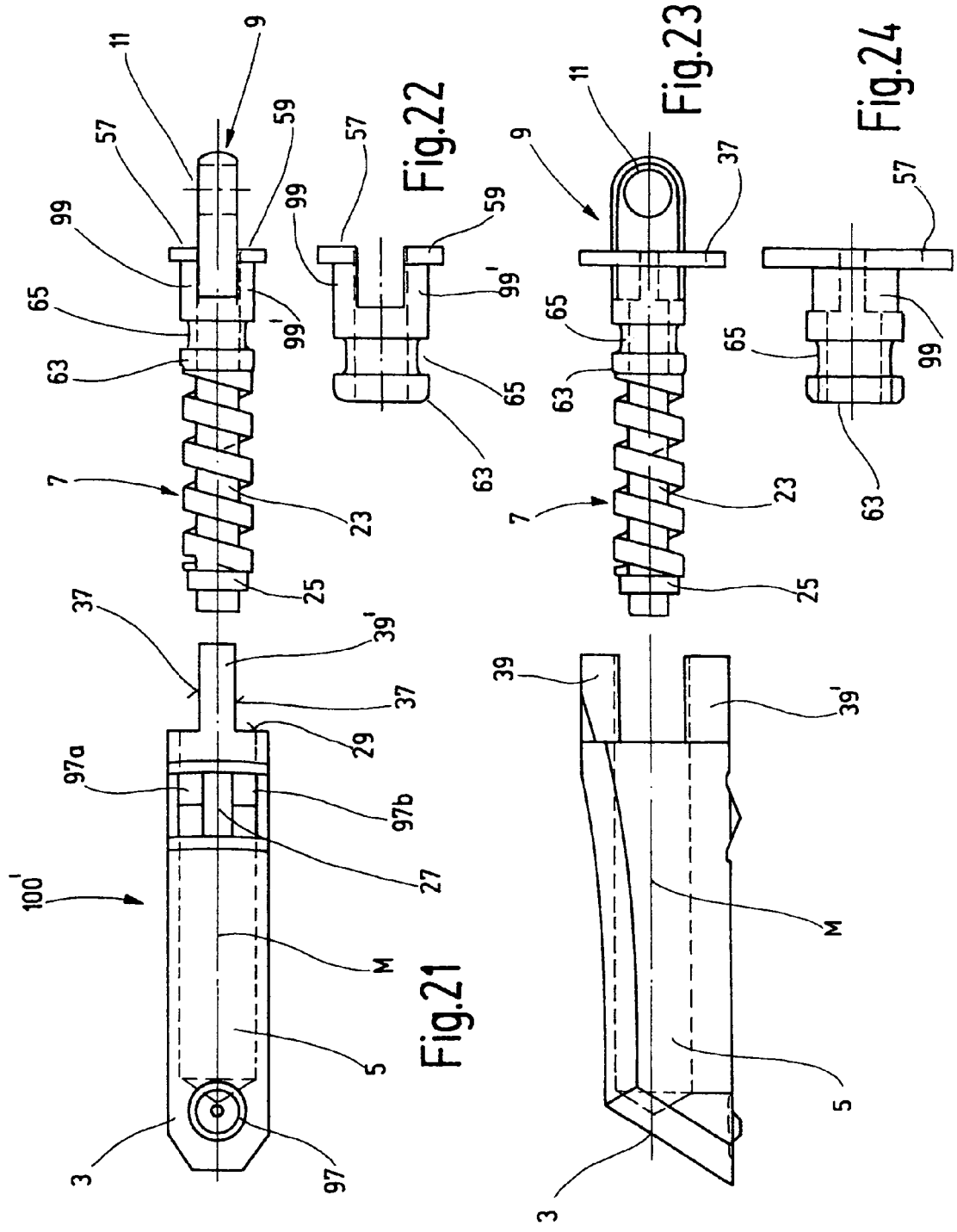

SPRING HINGE FOR GLASSES

The invention relates to a spring hinge for glasses with a central part and with side pieces wherein the hinge element is guided for displacement.

Spring hinges of the type mentioned here are known. They serve for connecting the lens-containing central part of a pair of glasses in a flexibly resilient manner to the side pieces. The side pieces can be displaced from a first functional position, in which they butt against the central part, into a second functional position, in which they run approximately at right angles to the central part. If the side pieces are pivoted outward beyond the second functional position, a spring device in the spring hinge is activated, and this spring device draws the side pieces back into the second functional position. For improved usage of the glasses, it is possible, for the purpose of putting the glasses on, for the side pieces to be pivoted outward beyond the second functional position and thus be overflexed. The spring device of the spring hinge is thus activated, to be precise such that the side pieces are drawn back into the second position. The spring device thus also causes the side pieces to be pressed against the wearer's head when the glasses are being worn, with the result that the glasses grip better.

Overflexing of the side pieces activates the spring device, with the hinge element being drawn some way outward out of the housing of the spring hinge counter to the restoring force of the spring device. This displacement of the hinge element requires guidance. In conventional spring hinges, the hinge element is inserted, together with the spring device, into a cavity which is introduced into the housing. Regions of the cavity interact with the hinge element such that a guide region is formed. This guide region serves for reliably guiding the hinge element as it is displaced and for preventing relative rotation between the housing and hinge element. The cavity, which on the one hand accommodates the spring device and the hinge element and on the other hand has guide regions, has to be of relatively long design in order for it to be possible to realize the guide regions wherever there is no spring device present. As seen over the length of the cavity, there are thus sections in which the spring device is arranged and further sections which form the guide region.

Spring hinges are preferably to be used more and more frequently in order to increase the wearing comfort of glasses. Since the glasses frames, in some models, are intricately formed, the spring hinges have to be very small. The fact that the cavity in the housing has to have sections for the spring device and for the guide region inevitably give rise to a relatively long construction of the housing and thus of the spring hinge. It is thus not possible to use the latter in some cases.

SUMMARY OF THE INVENTION

The object of the invention is thus to provide a spring hinge for glasses which does not have the above described disadvantage.

In order to achieve this object, the invention proposes a spring hinge which is distinguished in that at least one section of the guide region can be arranged outside the cavity accommodating the spring device and parts of the hinge element. The cavity may thus be of shorter design, with the result that the spring hinge becomes shorter overall.

A preferred exemplary embodiment of the spring hinge is one which is distinguished in that at least one section of the guide region is offset laterally in relation to the spring device. The guide region thus does not adjoin the spring device, as seen in the longitudinal direction of the spring hinge, with the result that the construction of the spring hinge is reduced in size.

In a particularly preferred exemplary embodiment of the spring hinge, the guide region can be arranged entirely outside the cavity. The cavity thus need merely be long enough to accommodate the spring device. This results in an extremely short spring hinge which can be used very universally. It is thus possible for the spring hinge to be used both on the side piece and in the region of the central part of a pair of glasses.

A further preferred exemplary embodiment of the spring hinge is distinguished in that the guide region is part of a hinge part interacting with the hinge element.

This also achieves the situation where the overall length of the housing of the hinge element can be reduced, because guide regions may be dispensed with here.

The invention is explained in more detail hereinbelow with reference to the drawing, in which:

BRIEF DESCRIPTION OF THE DRAWINGS

The invention is explained in more detail hereinbelow with reference to the drawing, in which:

FIG. 6 shows a partial longitudinal section through a further exemplary embodiment of a spring hinge;

FIG. 7 shows a plan view of the end side of the housing of the spring hinge illustrated in FIG. 6;

FIG. 8 shows a partial longitudinal section through a further exemplary embodiment of a spring hinge;

FIG. 9 shows a plan view of the end side of the housing of the spring hinge according to FIG. 8;

FIG. 10 shows a partial longitudinal section through a further exemplary embodiment of a spring hinge;

FIG. 11 shows a view of a locking element;

FIG. 12 shows a partial longitudinal section through a further exemplary embodiment of a spring hinge;

FIG. 13 shows a side view of a further exemplary embodiment of a spring hinge in a functional position which corresponds to that shown in FIG. 2;

FIG. 14 shows a side view of the hinge element which can be seen from FIG. 13;

FIG. 15 shows a side view of the hinge part illustrated in FIG. 13;

FIG. 16 shows an exploded illustration, in side view, of the spring hinge illustrated in FIG. 13;

FIG. 17 shows a plan view of the spring hinge according to FIG. 13, represented here in an exploded illustration;

FIG. 18 shows a side view of a further exemplary embodiment of a spring hinge in a functional position according to FIG. 2;

FIG. 19 shows a side view of the hinge element of the spring hinge illustrated in FIG. 18;

FIG. 20 shows a side view of the hinge part of the spring hinge illustrated in FIG. 18;

FIG. 21 shows an exploded illustration, in plan view, of the hinge element according to FIG. 19;

FIG. 22 shows a component of the hinge element illustrated in FIG. 21;

FIG. 23 shows an exploded illustration, in side view, of the hinge element represented in FIG. 19; and FIG. 24 shows a side view of the component illustrated in FIG. 22.

DESCRIPTION OF PREFERRED EMBODIMENTS

Figure 1:
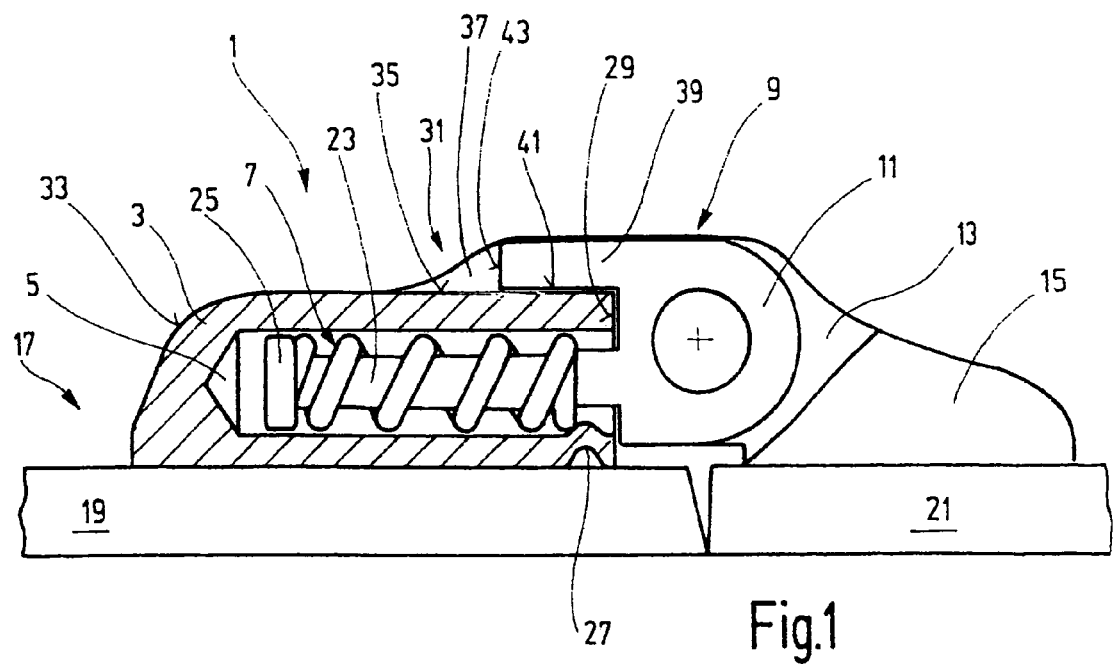
FIG. 1 shows a partial longitudinal section through a first exemplary embodiment of a spring hinge in a first functional position.

The exemplary embodiment of the spring hinge 1 which is illustrated in FIG. 1 has a housing 3, which is illustrated in longitudinal section. Provided in the interior of the housing is a cavity 5, for example a bore, which accommodates a spring device 7 and at least in part a hinge element 9. That part of the hinge element 9 which projects out of the cavity 5 is provided with a hinge eyelet 11, which interacts with a hinge eyelet 13 of a hinge part 15. The eyelet parts of the hinge eyelets are aligned one above the other and are connected rotatably to one another in a suitable manner, for example by special screws which are secured against release. Only parts of the glasses 17 are illustrated here. For example, it is assumed here that the housing 3 is positioned on a side piece 19 of the glasses 17 and the hinge part 15 is positioned on the central part 21 of the glasses 17.

The spring device 7 here has a helical spring which encloses part of the hinge element 9, here a pin 23. At the end which is located opposite the hinge eyelet 11, the pin 23 is provided with a securing means 25 which prevents the helical spring from slipping off. The securing means can be realized, for example, by virtue of the end of the pin 23 being upset or compressed or in some other known manner, for example by a head of a screw which is screwed into the hinge eyelet 11.

The clear width of the cavity 5 is selected such that the spring device 7 can be accommodated, for all practical purposes, in a friction-free manner in the interior of the housing 3 and the securing means 25 does not butt against the wall of the cavity 5. In order to avoid the spring device 7 or the hinge element 9 being drawn out of the cavity 5 of the housing 3, a suitable fixing means, in this case a bead 27, is provided. Here, the wall of the housing 3 is pressed inward, in certain regions, in the direction of the cavity 5, reducing the clear width of the cavity 5 in this region. It is thus no longer possible for the spring device 7 inserted into the housing 3 to be drawn out of the cavity 5.

The spring hinge 1 is illustrated in a first functional position in FIG. 1. The side piece 19 has been displaced from a rest position, in which it more or less butted against the central part 21, into the wearing position, in which the side piece 19 runs at approximately 90° in relation to the lenses of the glasses. In this functional position, the hinge eyelet 11 butts against that end side of the housing 3 which is directed toward the hinge eyelet; the spring device 7 or the helical spring thereof is only subjected to minimal prestressing.

A guide region 31 for the hinge element 9 is located on the outside of the housing 3. For example, here, a groove which has a base 35 and at least one side surface 37 is introduced into the outer surface 33. The guide region thus has two sections serving for guiding the hinge element 9, namely the base 35 and the side surface 37.

The hinge element 9 is provided with a protrusion 39 which, in this case, extends from the hinge eyelet 11 and, from there, runs in the same direction as the pin 23. The protrusion 39 is thus located in the groove bounded by the base 35 and the at least one side surface 37. The underside 41 of the protrusion 39 is directed toward the pin 23, and thus likewise forms a section of the guide region 31, which interacts with the base 35 of the groove. That side surface of the protrusion 39 which is directed away from the viewer forms, for its part, a section of the guide region 31 which interacts with the side surface 37 of the groove.

The depth of the groove or the height of the side surface 37 measured from the base 35 is coordinated with the height of the protrusion 39 such that the protrusion completely disappears in the groove and an outside surface of the housing 3 is also realized in the guide region 31. The outer surface 33 may slope down to the left of the end side 43 of the protrusion 39, in order to give the housing 3 a pleasing outward appearance.

It is also possible to close or cover the groove on the top side, that is to say to provide the housing, as it were, with two parallel cavities, the cavity 5 serving for accommodating the spring device 7 and parts of the hinge element 9 and the cavity which is parallel thereto serving for accommodating the protrusion 39.

The bead 27 here is provided on the underside of the housing 3, by means of which underside the housing 3 rests on the side piece 19. The spring hinge 1 is thus preassembled before being fitted on the side piece 19. In order for the spring properties of the spring device not to be adversely affected, the housing 3 is preferably fitted on the side piece 19 by electric welding. For this purpose, so-called welding projections may be provided in a known manner on the underside of the housing 3, and these projections melt as an electric current is passed through the housing 3 into the side piece 19, thus resulting in a secure connection between the housing and side piece. The housing 3 is pressed firmly onto the side piece 19 during electric welding. The welding projections melt very quickly, with the result that sustained heating of the spring device or of the helical spring thereof is ruled out. The spring properties thus remain unimpaired.

It is also possible for the hinge part 15, since there is no spring provided here, to be soldered onto the central part 21. Here too, however, electric welding is, of course, also possible.

Figure 2:
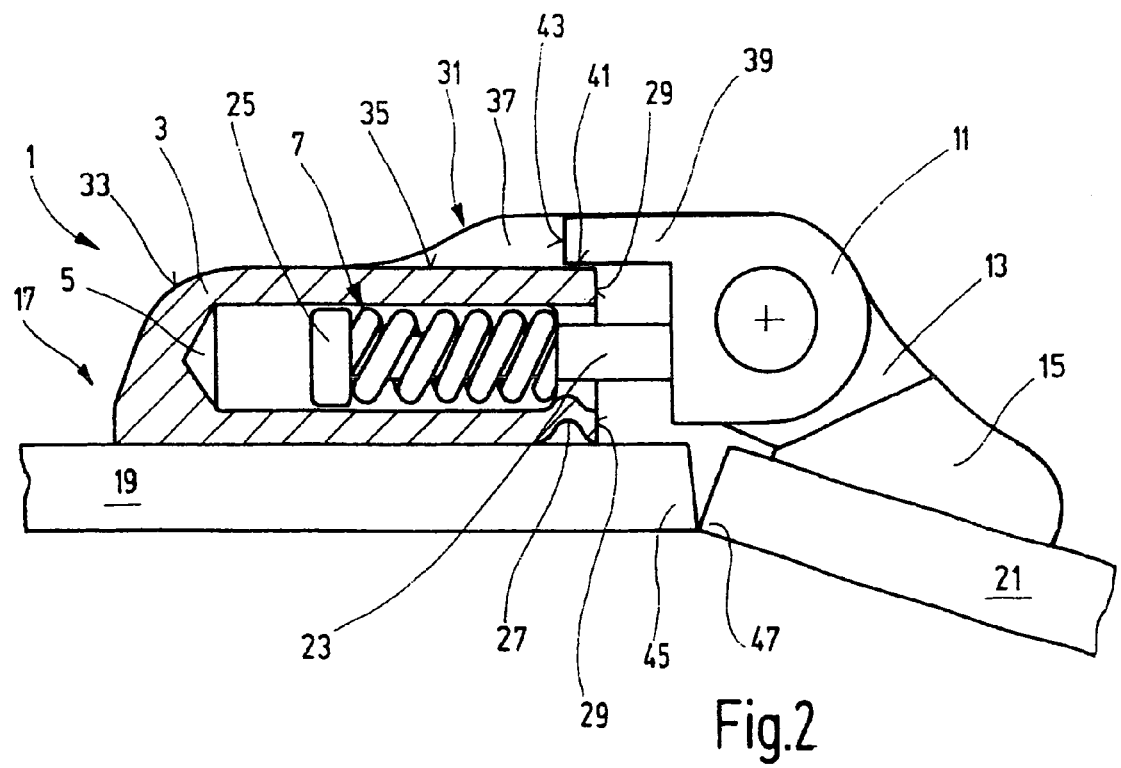
FIG. 2 shows a partial longitudinal section through the exemplary embodiment illustrated in FIG. 1, this time in a second functional position.

FIG. 2 shows the spring hinge 1 illustrated in FIG. 1 in a second functional position. The same parts are provided with the same designations as in FIG. 1.

Here, the side piece 19 has been overflexed in relation to the central part 21, that is it has been pivoted outward beyond the wearing position. The outer edges 45 and 47 of the side piece 19 and central part 21 interact with one another in a known manner such that the hinge element 9 is drawn out of the cavity 5 of housing 3 counter to the force of the spring device 7, and the spring device 7 is activated and/or the helical spring is compressed. The bead 27 prevents the spring device 7 from being drawn out of the cavity 5 of the housing 3. The spring device is thus clamped in and compressed between the bead 27 and the securing means 25. The spring device 7 subjects the pin 23 to a restoring or tensile force which is directed to the left, with the result that the hinge eyelet 11 is drawn back to the housing 5. This results in the side piece 19 and central part 21 being displaced back into their first functional position according to FIG. 1.

The restoring action of the spring hinge 1 is known in principle, in which case no further details need be discussed here.

It should also be pointed out that the housing 3 of the hinge element 9, with a corresponding configuration of the glasses 17, may also be arranged on the central part. The hinge part 15 is then fastened on the side piece.

The illustrations in FIGS. 1 and 2 clearly show that the pin 23 runs, for all practical purposes, without guidance in the interior of the housing 3, that is in the cavity 5, and that the guidance of the hinge part 9 here is realized by the guide region 31 provided outside the cavity 5. In this case, the guide region 31 is designed completely separately from the cavity 5. The length of the cavity 5 thus need merely be dimensioned to accommodate the spring device 7 here. There is thus no need, in the longitudinal direction of the cavity, for any guide surfaces, which would increase the overall length of the housing 3.

The spring hinge illustrated here is thus distinguished by its overall length being extremely short. This fact in particular results in it being possible for the spring hinge 1 to be arranged optionally on the central part 21 or on the side piece 19 of the glasses 17. If the outer surface 33 of the housing 3 has introduced into it a groove with a base 35 enclosed on both sides by side surfaces, of which the side surface 37 is illustrated here, then the guide region 31 acts not just for guiding the hinge element 9 as it is displaced in the longitudinal direction of the cavity 5, but also as a rotation-prevention means, preventing relative rotation between the hinge element 9 and housing 3, and as a stabilizing means. Since the protrusion 39 spans a region of the base 35 in the longitudinal direction of the housing 3, tilting of the hinge element 9 about a pivot axis located perpendicularly to the drawing plane is also very greatly reduced or prevented.

Figure 3:
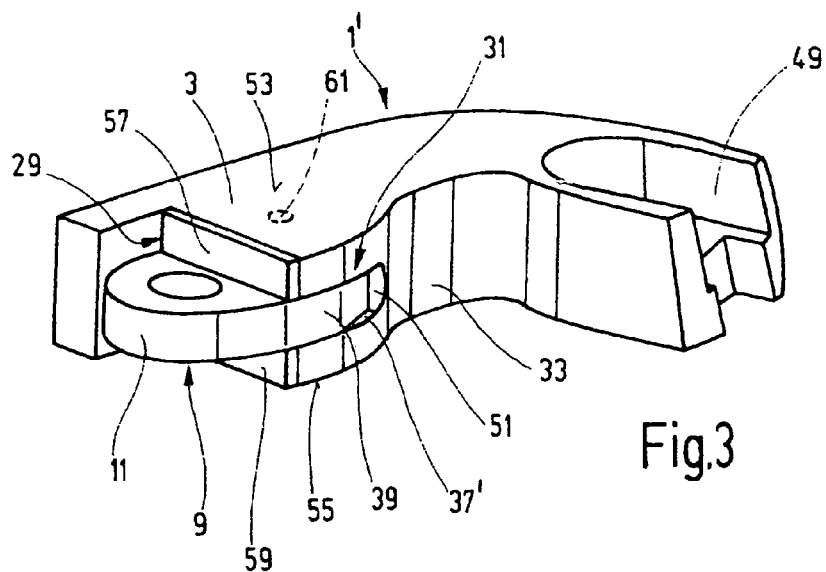
FIG. 3 shows a perspective illustration of a second exemplary embodiment of a spring hinge.

FIG. 3 shows a second exemplary embodiment of a spring hinge 1'. The same parts are provided with the same designations as in the previous Figures.

FIG. 3 shows a spring hinge with a housing 3 formed by a curved part of the glasses frame. It is assumed here that the housing 3 belongs to the central part 21 of a pair of glasses. That element of the glasses frame which is illustrated here is curved approximately at right angles. Provided at the right-hand end of the element is a depression 49, to which the central part of the glasses (not illustrated specifically here) can be attached. The way in which the element is fitted on the central part, however, is irrelevant as far as the functioning of the spring hinge 1' is concerned.

The hinge eyelet 11 of the hinge element 9 is shown clearly here. Extending from the hinge eyelet 11 is a protrusion 39, which is accommodated in a groove 51 which is bounded by side surfaces on both sides. It is possible to see here part of the side surface 37' which forms a section of the guide region 31 and interacts with a side surface of the protrusion 39. The depth of the groove 51 is selected such that the protrusion 39 does not project beyond the outer surface 33 of the housing 3.

The hinge eyelet 11 here is arranged centrally in relation to two side members 53 and 55 of the housing 3. In the case of such a configuration of the spring hinge 1, preferably two spaced-apart hinge eyelets are provided on a hinge part (not illustrated here) which was designated 15 in FIGS. 1 and 2, the hinge eyelet 11 of the hinge element 9 ending up located between these two hinge eyelets. The number of hinge eyelets on the hinge part 15 can be selected dependent on the desired stability of the hinge connection. It is thus possible to provide just one hinge eyelet in each case both on the hinge element and on the hinge part. The hinge eyelets of the hinge part (not illustrated here), rather than having a circular outer contour, are provided, in a known manner, with noses which slide along the end side 29 of the housing 3. Material strips 57 and 59 are provided here to the right and left of the hinge eyelet 11, and each form a running surface for such noses. The running surfaces reduce the wear produced by the pivoting movement, in particular if the housing 3 and the hinge eyelets of the hinge part 15 consist of a material with poor sliding properties in a material pairing, for example of titanium.

The hinge element 9 is inserted directly into the housing 3 formed by the element of the glasses frame. The hinge device 7 may be fixed, in turn, by a bead which, in this case, is indicated by a dashed-line circle 61. It is also possible for the bead to be provided on the rear side of the housing 3, which is directed away from the protrusion 39 and is not visible here.

Figure 4:
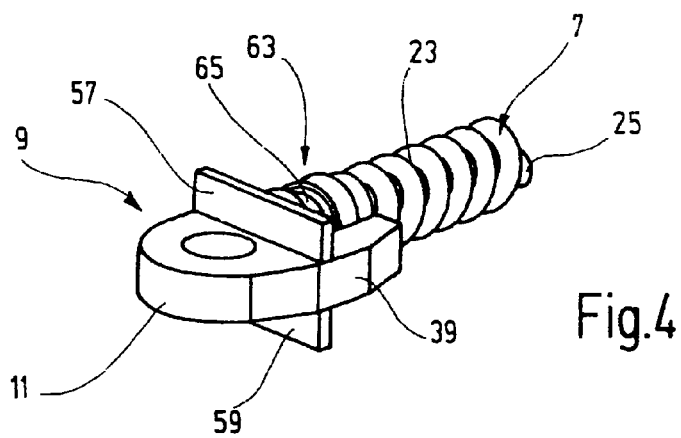
FIG. 4 shows a hinge element with a spring device.

FIG. 4 shows a perspective view of the hinge element 9. The same parts are provided with the same designations in the previous Figures.

The hinge element 9 has a hinge eyelet 11, from which the protrusion 39 extends, and also a pin 23, which runs essentially parallel to the protrusion 39 and ends up located in the interior of the housing 3. The spring device 7 here is designed, once again, as a helical spring which encloses the pin 23. Located, once again, at that end of the pin which is directed away from the hinge eyelet 11 is a securing means 25, which prevents the helical spring from slipping off, with the result that this spring is clamped in between the hinge eyelet 11 and the securing means 25. In this case the helical spring, rather than butting directly against the hinge eyelet 11, butts against a ring 63, with an encircling groove 65 introduced into its outer surface. The bead, which is indicated by the circle 61, engages in this groove. The ring 63 is thus retained securely in the cavity 5 (not illustrated here) of the housing 3 and a situation where the spring device 7 or the hinge element 9 is drawn out is reliably avoided.

In the exemplary embodiment illustrated here, the material strips 57 and 59 are provided on the ring 63. These strips run essentially perpendicularly to the longitudinal extent of the pin 23 and thus to the movement direction of the hinge element 9 in the interior of the housing 3. They serve on the one hand as a running surface for noses on the hinge eyelets of the hinge part and, on the other hand, also for reliably closing the cavity 5 in the housing 3 and thus protecting it against soiling.

Figure 5:
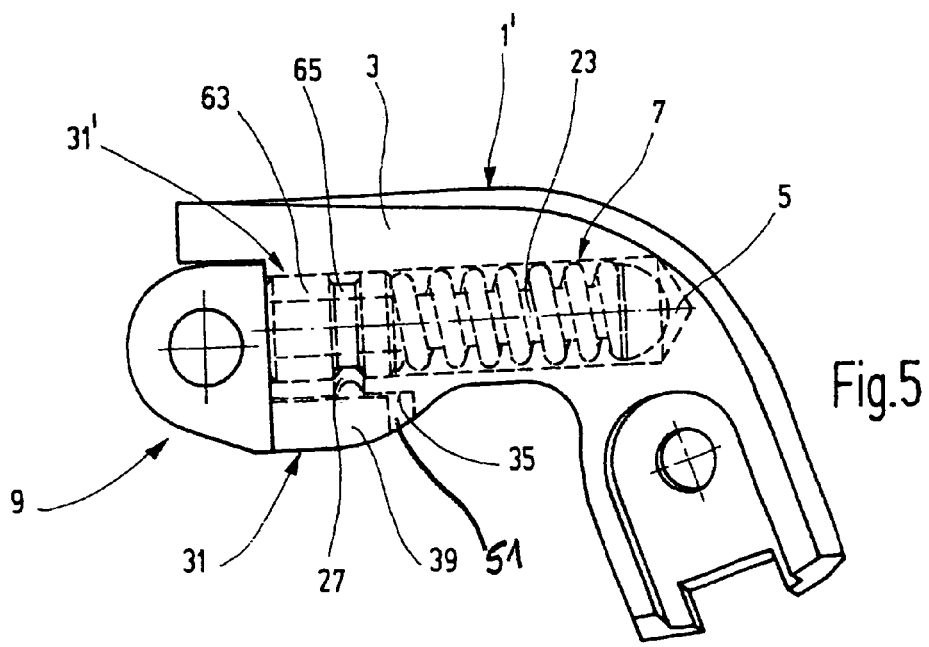
FIG. 5 shows a side view of a modified exemplary embodiment of a spring hinge similar to that in FIG. 3.

FIG. 5 shows a spring hinge 1' which is modified slightly in relation to that in FIG. 3. The same parts are provided with the same designations as in FIG. 3.

The housing 3 of the spring hinge 1', once again, is an element of a glasses frame, the interior of which contains a cavity 5, which is illustrated here by dashed lines and accommodates a spring device 7 with a helical spring which runs around a pin 23 of the hinge element 9. Also positioned around the pin 23 here is a ring 63, which has an encircling groove 65 in its outer surface. Engaging in this groove is a bead 27, which is introduced into the housing 3 from the base 35 of a groove 51 and thus secures the ring 63 against being drawn out of the cavity 5. The hinge element 9 is thus also retained securely in the cavity 5.

The bead 27 is arranged such that it is completely concealed by the protrusion 39 in that functional position of the spring hinge 1' which is illustrated here, and in which the hinge element 9 has not been drawn out of the cavity 5. This results in optimum visual properties of the spring hinge 1'. The bead 27 is only visible, albeit only on the base of the groove, when the hinge element 9, as is illustrated in FIG. 2, has been drawn part of the way out of the housing 3.

The parts inserted into the housing 3 are illustrated by dashed lines here. It can clearly be seen that the length of the cavity 5 is selected such that, on the one hand, the spring device 7, which is a helical spring, and, on the other hand, the ring 63 are accommodated by the cavity 5. The length of the cavity 5 is thus determined by the overall length of the ring and of the spring device. Overall, the housing 3 is therefore longer, as seen in the direction of the pin 23, than the spring hinge 1 shown in FIGS. 1 and 2.

The ring 63 here may make up part of a guide region 31'. Moreover, it is also the case here, as with the previous exemplary embodiments, that the guide region 31 is realized in the region of the protrusion 39 and of the associated groove 51, as has been explained with reference to the previous Figures. The housing 3 is thus made longer by the ring 63. It is also possible, however, to realize the additional guide region 31' in the interior of the housing, that is in the region of the cavity 5. If the entire guide region of the spring hinge 1 is thus realized, on the one hand, by the inner guide region 31' and, on the other hand, by the outer guide region 31, then the overall length of the housing 3 increases. Since the inner guide region 31', however, may be of relatively short configuration, because additional guidance is ensured by the outer guide region 31, the spring hinge 1' which is illustrated here FIG. 5 is still shorter than conventional spring hinges of which the entire guide region is realized in the region of the cavity 5.

FIG. 6 shows a spring hinge 1" which is modified slightly in relation to that illustrated in the previous Figures. The same parts are provided with the same designations as in FIGS. 1 to 5.

The spring hinge 1" has a housing 3 which can be fitted on a side piece (not illustrated here) or a central part of a pair of glasses or else, as has been explained above, may be part of a glasses frame. Provided in the interior of the housing 3 is a cavity 5 which accommodates a spring device 7, for example, a helical spring. The cavity 5 also at least partially accommodates a hinge element 9, in this case a pin 23 of the hinge element 9, the pin passing through the helical spring. The spring device 7, here a helical spring, is retained in the cavity 5 by a bead 27 which is introduced into the housing 3 from the bottom, that is from the side which subsequently rests on the side piece or central part of a pair of glasses. In the installed state of the spring hinge 1", the bead 27 therefore cannot be seen. The helical spring is thus supported, on the one hand, on the bead 27, which projects into the clear width of the cavity 5, and, on the other hand, on a securing means 25, which is provided at that end of the pin 23 which is directed away from the hinge eyelet 11.

The hinge element 9 has a section which extends from the hinge eyelet 11 and interacts with the guide region 31, this section being a protrusion 39. In contrast to the previous exemplary embodiments, this protrusion, rather than being exposed in the outward direction in the guide region 31, is enclosed on the outside by the housing 3.

The protrusion 39 projects from the hinge eyelet 11 in the direction of the pin 23. In this case, it is located parallel to the latter and at such a distance therefrom as to produce an interspace 67 between the protrusion 9 and the pin 23, and part of the spring device 7, that is in this case part of the helical spring, is arranged in the interspace.

This configuration ensures that the hinge element 9 can be guided by the guide region 31, the guide region being located alongside the spring device 7, in other words not adjoining the latter. This ensures a relatively short and low construction of the spring hinge 1".

It is also the case with the exemplary embodiment illustrated in FIG. 6 that the guide region 31 is located outside the cavity 5, which serves for accommodating the spring device 7. The cavity thus has an internal diameter which is somewhat larger than the external diameter of the spring device, that is to say of the helical spring, which encloses the pin 23. The guide region 31 is located outside that region of the cavity which has this internal diameter coordinated with the helical spring, and it is realized by a groove 65. In the exemplary embodiment illustrated here, the guide region 31 is thus located outside the cavity 5 accommodating the spring device 7, but is realized by a groove 65 which is connected to the cavity.

A plan view of the end side 29 of the housing 3 is illustrated in FIG. 7. In this illustration, the hinge element 9 has not yet been introduced into the cavity 5. It is thus shown clearly here that the guide region 31 is provided alongside the cavity. It is realized by a groove 65 which is introduced into the basic body of the housing 3, is closed on the outside and, in this case, has, by way of example, an essentially rectangular cross section. The protrusion 39, which may have, in principle, a circular cross section, but is preferably likewise of essentially rectangular design, projects into this groove 65, with the result that the protrusion 39 is provided with guidance, on the one hand, by the base 69 of the groove 65, the base being directed away from the cavity 5, but, on the other hand, also by the lateral boundary walls 71 and 73 of the groove.

Since the guide region 31 is arranged outside the cavity 5, it can also act, as has already been described above, as a rotation-prevention means. The hinge element 9 thus cannot be rotated within the cavity 5 because the protrusion 39 is supported laterally by the boundary walls 71 and 73.

That partial longitudinal section through a further exemplary embodiment of a spring hinge 10 which is represented in FIG. 8 shows, once again, a housing 3 and a hinge element 9 at least partially inserted in a cavity 5 of the housing. The same parts are provided with the same designations as in previous Figures.

In the exemplary embodiment illustrated in FIG. 8, the hinge eyelet 11 of the hinge element 9, once again, has a protrusion 39 which, as in the previous exemplary embodiments, extends in the direction of the pin 23, and is spaced apart from the latter, with the result that the spring element 7 may be arranged in the interspace 67 between the protrusion 39 and the pin 23 and the protrusion 39 projects beyond the spring element 7 in certain regions. The protrusion interacts with a guide region 31, as has already been explained with reference to FIGS. 1 and 2 as described above.

Here too, the spring element 7 has a helical spring which is supported, on the one hand, on a securing means 25, which is provided at that end of the pin 23 which is directed away from the hinge eyelet 11, and, on the other hand, on an abutment 75, which is formed by a deformation made in the end side 29 of the housing 3. It is thus possible to realize an abutment by forcing action.

That plan view of the end side 29 of the housing 3, into which the hinge element 9 is inserted, which is represented in FIG. 9 shows that three abutments may be provided, that is to say the already mentioned abutment 75 at the bottom and, in addition, two lateral abutments 75' and 75". The bottom abutment 75 may be introduced by the hinge element 9 being drawn out counter to the force of the spring element 7 to the extent where the protrusion 39 is no longer located in the area of the guide region 31 and the hinge element 9 can be rotated about the pin 23.

However, it is also sufficient, in principle, for the spring element 7 to be secured in the cavity 5 by means of an abutment. The abutments 75' and/or 75" are the easiest to realize here.

The spring hinge 10' which is illustrated in partial section in FIG. 10 is modified in relation to that which is illustrated in FIG. 8 insofar as the hinge element 9 is fixed differently in the housing 3. Otherwise, the same parts are provided with the same designations as in which case you the description above.

A slot 77 is introduced into the underside of the housing 3 and has a locking element 79 inserted through it, the locking element projecting into the cavity 5 such that the spring element 7 cannot be drawn out of the cavity. In the case of the exemplary embodiment illustrated here, the locking element 79 interacts with a ring 63 with an encircling groove 65 introduced into its outer surface. The locking element 79 engages in the groove 65 such that the ring 63 is secured against axial displacement in the interior of the cavity 5. In this case, the spring element 7, rather than being supported directly on the locking element 79, is supported on the ring 63 retained by the element 79.

FIG. 11 shows the locking element 79 in plan view, that is rotated through 90° in relation to the illustration selected in FIG. 10. It can thus be seen from FIG. 11 that the locking element 79 may be of U-shaped design, that is it may have a base 81 from which two legs 83 and 85 extend.

It is possible, in principle, for the spring element 7 to be fixed in the cavity 5 by one or two pins which are not connected to one another, that is to use a single leg 83 and/or 85 for fixing purposes.

Finally, FIG. 12 shows a further exemplary embodiment of a spring hinge 10". This is constructed, in principle, in the same way as those described in FIGS. 8 and 10. The same parts are thus provided with the same designations as in the description above.

The only difference here is the fixing of the hinge element 9 and/or of the spring element 7 in the cavity 5, which is introduced into the housing 3 of the spring hinge 10". In this case a pin 87 is provided, the latter being inserted from above into an opening 89 which is provided in the housing 3, in the base 35 of the groove which realizes the guide region 31. In that functional position of the spring hinge 10" which is illustrated in FIG. 12, the pin 87 is concealed and secured by the protrusion 39. The pin 87 is selected to be long enough to project into the cavity 5 and secure the spring element 7 against axial displacement. The pin 87 can interact directly with the spring element 7, which in this case is designed as a helical spring. However, it is possible, as has been described above, for the pin to interact with a ring 63 which is retained securely in the cavity 5 by the pin 87 and serves as an abutment for the spring element 7. The ring 63 may, as is illustrated here, be provided with an encircling groove 65, with the result that the pin 87 can easily be inserted irrespective of the rotary position of the ring 63. The pin 87 may also be inserted laterally, or from beneath, into the housing 3 such that it projects into the cavity.

The shortest construction of the spring hinge 1, 1', 1", 10, 10', 10" can be realized, as can be seen from FIGS. 1, 2, 6, 8, 10 and 12, when the guide region 31 is shifted out of the region of the cavity 5, for example into the region of the outer surface 33 of the housing 3.

It can clearly be gathered from the functioning of the spring hinge that the protrusion 39 can, in principle, also be provided on the opposite side of the hinge element 9, that is to say on the underside thereof or laterally, and thus takes effect in another section of the housing 3. Finally, it is also possible to provide two such protrusions which are located opposite one another and guide the hinge element 9 on both sides.

The most compact construction, however, can be realized when just a single protrusion 39 is provided, this, on the one hand, interacting with the guide region 31 and, on the other hand, forming, with the guide region, a rotation-prevention means and/or stabilizing means for the spring hinge 1, 1', 1", 10, 10', 10".

The explanations clearly show that the guide region 39 can be realized easily and cost-effectively. All that is required for producing the hinge element 9, which may be produced for example in a stamping operation, is one protrusion 39 which extends from the hinge eyelet 11 and runs in the direction of the pin 31. The groove 51 can easily be introduced into the outer surface of the housing 3. The concealed groove 51 can also readily be realized by a cavity or bore that runs parallel to the cavity 5, and then accommodates the protrusion 39.

In the case of the exemplary embodiments which are described here, the groove is essentially U-shaped, the base 35 enclosing a right angle in each case with the side surfaces in order to accommodate a cross-sectionally rectangular or square protrusion 39. In principle, however, it is also possible, in particular in the case of a concealed groove designed as a bore, for the protrusion to have an oval or circular cross section. The critical factor is that the protrusion is part of a guide device which has a guide region located outside the cavity 5, with the result that the spring hinge 1, 1', 1", 10, 10', 10" is of very short construction. The Figures show that the groove is longer than the protrusion 9. However, this is not of critical importance. The significant factor is that the guide region 31 has sections which are located outside the cavity 5, for example on the outside of the housing 3, and which interact with a hinge-element region which likewise comprises a section which is assigned to the guide region 31. In the exemplary embodiments which are described here, the region of the hinge element 9 is designed as a protrusion 39 which is arranged outside the cavity 5 and interacts with at least one section of the guide region 31 of the housing 3. Particularly good guidance is achieved if the groove encloses the protrusion on three sides, as this results in a rotation-prevention means in both directions of rotation about the central axis of the pin 23.

The explanations of the exemplary embodiments have been based, by way of example, on the spring element 7 comprising a helical spring. It is also conceivable to provide a spring element, for example a meandering spring, to the right and/or left alongside the pin 23.

The explanations relating to the different exemplary embodiments of the spring hinge clearly show the following: the construction of the spring hinge can be significantly reduced by providing, for the hinge element 9, a guide region 31 which does not adjoin the spring element 7. Rather, it is ensured that the guide region 31 is located alongside the spring element 7. It is possible here to realize the guide region 31 directly alongside the guide element 7, which can be seen, for example, from the illustration according to FIG. 6. It is also possible to provide a wall section of the housing 3 between the guide region 31 and the spring element 7, as is the case with the exemplary embodiments according to FIGS. 1, 2, 5, 8, 10 and 12. The guide region 31 interacts with a section of the hinge element 9 which, in this case, is designed, for example, as a protrusion 39. The latter extends, out of the from the hinge eyelet 11, in the same direction as the pin which interacts with the spring element 7. It is spaced apart from the pin 23, with the result that the spring element 7 can always be accommodated between the protrusion 39 and the pin 23, as can, possibly, a wall section of the housing 3 as well. The significant factor here is that the protrusion 39 extends over a region of the spring element 7, the guide region 31 likewise extending over a region of the spring element 7. The longitudinal extent of the spring element 7 and that of the guide region 31 thus do not add to one another. This results in the short construction of the spring hinge 1.

Those embodiments of the spring hinge which are illustrated in FIGS. 1 to 12 are thus distinguished in that at least one section of the guide region 31 is arranged outside the cavity 5, it being possible for the guide region to be located entirely outside the cavity 5 or, as has been explained with reference to FIGS. 6 and 7, although arranged outside the cavity 5, to be connected to the latter by virtue of the guide region 31 being realized by a groove 65 introduced into the inner wall of the cavity 5.

The exemplary embodiments of a spring hinge which will be described hereinbelow are ones in which the guide region 31 is arranged outside the cavity 5 and can be realized by at least one protrusion 39 which extends from the end side 29 of the housing 3. The protrusion 39 realizes an extension of the housing 3, although this does not affect the overall construction of the hinge, comprising a spring hinge and a hinge part, for a pair of glasses because the guide region 31 is realized on the hinge part 15, and the protrusion 39 thus engages in a region of the hinge part 15. The housing 3 of the spring hinge 1 is shortened in the region of the cavity 5 for the spring device 7 because the cavity 5 no longer needs any guide region 31 as is the case with spring hinges of the conventional type.

The exemplary embodiments described here therefore have in common the fact that the overall length of the housing 3 of the spring hinge 1 which is visible from the outside is shortened in that, rather than the cavity 5 and the guide region 31 adding to one another, this guide region is arranged outside this cavity 5. The exemplary embodiments of the spring hinge 100 is provided with at least one protrusion 39 in the region of the end side 29 of the housing 3. This protrusion interacts with a guide region 31 in the region of the hinge part 15 and will be discussed in more detail with reference to FIGS. 13 to 24. These Figures thus show spring hinges and the elements thereof. The same parts are provided with the designations used in FIGS. 1 to 12.

FIG. 13 shows a side view of an exemplary embodiment of a spring hinge 100 with a housing 3 with at least one protrusion 39 extending from its end side 29. In this case, two spaced-apart protrusions 39 and 39' are provided at the top and bottom of the housing 3. These protrusions engage in the hinge part 15 and thus realize a guide region 31 here. The length of the protrusions 39, 39' measured from the end side 29 is selected such that, even in the overflexed state, they still engage in the hinge part 15, in order also to realize a rotation-prevention means in this functional position of the spring hinge 100. It is thus not possible, in the case of this configuration and realization of the rotation-prevention means, for the hinge part 15 to be rotated in relation to the housing 3.

Located between the two protrusions 39 and 39' here is the hinge element 9, which projects into the interior of the housing 3.

The hinge eyelet of the hinge element 9 is concealed here by the hinge eyelet 13 of the hinge part 15. The two hinge eyelets are connected to one another in a pivotable manner by a suitable screw 91.

In the case of the exemplary embodiment which is illustrated here, the housing 3 is positioned on a side piece 19 of a pair of glasses, and the hinge part 15 is positioned on the central part of the glasses. Here too, however, it is also possible to design the spring hinge 100 as has been explained with reference to FIG. 3. In this case, the housing 3 is then part of the central part of the glasses.

FIG. 14 shows the spring hinge 100 without the hinge part 15. The hinge element 9, which is located between the protrusions 39 and 39', can clearly be seen here, its hinge eyelet 11 being of essentially T-shaped design: the end region of the hinge element 9 is thus wider than the interspace provided between the protrusions 9 and 9', with the result that the end region butts against the end side 29' of the protrusions 39, 39'.

The illustration according to FIG. 14 uses dashed lines to show the cavity 5 in the interior the housing 3, the cavity accommodating the spring device 7, in this case the helical spring, which, on the one hand, on a securing means 25 and, on the other hand, at the opposite end on a bead 27, which in this case is introduced into the housing 3 from the bottom and projects into the cavity 5 such that, even in the case of the hinge element 9 being subjected to a tensile force, the helical spring of the spring device 7 cannot be drawn out of the cavity 5.

The hinge part 15, which is illustrated in side view in FIG. 15, is likewise illustrated on its own. It has at least one hinge eyelet 13, preferably two spaced-apart hinge eyelets, of which the front one can be seen here in FIG. 15. That side of the hinge eyelet 13 which is directed away from the viewer is located, in the installed state, on that side surface of the protrusions 39 and 39' which is directed toward the viewer, with the result that, although the hinge element 9 can be moved in the direction of the central axis M of the helical spring and/or of the pin 23 of the hinge element 9, the hinge element 9 and the hinge part 15 cannot be rotated in relation to the housing 3.

FIG. 16 shows an exploded illustration of the parts of the spring hinge 100, represented in FIG. 13, together with the hinge part 15. The same designations refer to the same parts as in the previous figures.

It can clearly be seen that the hinge part 9 can be pushed into the cavity 5, which is preferably produced by a bore. The diameter of the bore here is preferably larger than the distance between the protrusions 39 and 39', with the result that the facing inner surfaces of the protrusions 39 and 39' are curved with a radius and run parallel to the central axis M.

The hinge element 9 can be pushed into the cavity 5 and anchored securely there by means of the bead 27 mentioned in respect of FIG. 14. The pin 23 of the hinge element 9 can be seen clearly here, the pin bearing the spring element 7, which in this case is designed as a helical spring, and being supported, on one side, on the securing means 25, which constitutes an increase in diameter of the pin 23. On the opposite side, the spring element 7 is supported on the basic body of the hinge element 9, of which the extent measured perpendicularly to the central axis M is greater than the external diameter of the pin 23.

The illustration according to FIG. 16 clearly shows the T-shaped configuration of the right-hand end of the hinge element 9 with the hinge eyelet 11. This configuration serves to realize a stop together with the end surface 29' of the protrusions 39 and 39'.

The thickness of the hinge element 9 measured perpendicularly to the drawing plane is smaller than the distance between the hinge eyelets 13 of the hinge part 15. The same applies to the corresponding thickness of the protrusions 39 and 39'. It is thus possible for the hinge element 9 and the protrusions 39, 39' to engage in the free space located between the hinge eyelets 13 of the hinge part 15.

That plan view of the parts in FIG. 16 which are represented in FIG. 17 shows particularly clearly that the hinge part 15 here has two spaced-apart hinge eyelets 13 and 13' with the free space 93 between them, in which are arranged, on the one hand, the right-hand T-shaped end of the hinge element 9, that is the hinge eyelet 11, and, on the other hand, the protrusions 39 and 39' of which the top protrusion 39 is visible here. The lateral boundary surfaces 37' of the free space 93, which run parallel to the central line M, interact with the side surfaces 37 of the protrusions 39 and 39' in order to form the guide region 31.

The plan view according to FIG. 17 in particular clearly shows that the at least one protrusion 39, and particularly the two spaced-apart protrusions 39 and 39' together, interacts/interact with the side surfaces 37' of the guide region 31 such that a relative rotation between the housing 3 of the spring hinge 100 and the hinge part 15 is ruled out, although axial guidance within the hinge part 15 is ensured.

FIG. 18 shows a further exemplary embodiment 100'. The same parts are provided with the same designations as in the previous Figures.

The spring hinge 100' has a housing 3 with at least one protrusion, in this case once again two protrusions 39 and 39' spaced apart from the central axis M, extending from its end side 29 and projecting in the direction of the hinge part 15. Here too, the protrusions 39, 39' interact with the at least one hinge eyelet 13 of the hinge part 15 and thus realize a rotation-prevention means which prevents the housing 3 from rotating in relation to the hinge part 15, axial movement of the hinge element 9 in the direction of the central axis M being possible.

In FIG. 18, the spring hinge 100' has been moved into its overflexed position, in which the hinge element 9 has been drawn out of the interior of housing 3.

Resting on the end side 29 here is a material strip 57, along which a nose 95 of the hinge eyelet 13 runs when the hinge part 15 is pivoted in relation to the housing 3. The material strip 57 prevents scuffing of the nose 95 along the end side 29, which can be observed, in particular, when the nose 95 and the end side 29 consist of titanium FIG. 19 shows the housing 3 of the hinge element without the side piece 19, on which the housing is fitted. The hinge 15 has also been removed.

FIG. 19 shows welding projections 97, which are provided on the underside of the housing 3 and serve for fitting the housing 3 on the side piece 19 by means of electric welding.

The hinge eyelet 11 of the hinge element 9 here is only of such a height as is provided for by the free space between the two protrusions 39 and 39' running essentially parallel to the central axis M. The hinge element here is anchored by means of a ring 63 in the cavity 5 in the housing 3. The ring 63 here preferably has an encircling annular groove 65, in which engages a bead 27 which is introduced into the housing 3 from the bottom and thus cannot be seen in the installed state of the housing 3. The ring 63, which is retained in a non-displaceable manner in the direction of the central axis M, serves, on the one hand, as an abutment for the spring element 7 which comprises a helical spring supported, on the other side, on a securing means 25, and, on the other hand, as a stop for the hinge element 9 which, in the direction perpendicular to the central axis M, has a greater extent than the pin 23, which runs parallel to the central axis M and passes through the spring element 7. In the case of this exemplary embodiment, it is thus possible to dispense with the T-shaped widening of the hinge element 9 which was explained with reference to FIGS. 14 and 16.

FIG. 19, once again, shows the material strip 57, which protects the end side 29 of the housing 3 against wear.

FIG. 20 shows the hinge part 15 on its own. This part comprises at least one hinge eyelet 13. It is also possible to see here a welding projection 97' on the underside of the hinge eyelet 15, the welding projection being used to fit this hinge part on a central part 21 of the glasses by means of electric welding. Of course, as with the housing 3 according to FIG. 19, other fastening methods are also possible here. The nose 95 of the hinge eyelet 13 is also shown clearly here.

FIG. 21 shows an exploded illustration of the spring hinge 100' with the hinge element 9 from beneath. It can be seen here that the welding projection 97 at the left-hand end of the housing 3 may be of round design in plan view. Two welding projections 97a, 97b which are spaced apart from the central axis M can be seen at the right-hand end. FIG. 19 shows the welding projection 97a in side view. There is a free space, into which the bead 27 can be introduced, between the welding projections.

The at least one protrusion projects to the right from the end side 29 of the housing 3. The protrusion 39', that is to say the bottom protrusion, can be seen here. Dashed lines are used to show a cavity 5 in the housing 3, into which the hinge element 9 can be pushed in part, with the result that the spring element 7 ends up located in the cavity. This spring element comprises a helical spring which engages around the pin 23 and is supported, on the one hand, on the securing means 25 and, on the other hand, on the ring 63, which butts against the front part of the hinge element 9, in this case against the hinge eyelet 11. The ring here has two arms 99 and 99' which project to the right, between which the hinge eyelet 11 is located and on which the material strips 57 and 59 are fitted at the front, these material strips, in the assembled state of the spring hinge 100', resting on the end side 29 of the housing 3.

The grove 65, which has already been mentioned above, is introduced into the circumferential surface of the ring 63, the groove preferably being designed as an encircling annular groove in order that the bead 27 can easily engage.

For reasons of clarity, the ring 63 is illustrated again on an enlarged scale in FIG. 22. The arms 99 and 99', on which the material strips 57 and 59 are fitted, can be seen clearly.

The side view according to the FIG. 23 shows, once again, the housing 3, into which the hinge element 9 can be inserted such that it is at least partially arranged in the cavity 5, which is illustrated by dashed lines here. Here too, the distance between the protrusions 39 and 39' is smaller than the diameter of the cavity 5, with the result that the inner surfaces of the protrusions 39 and 39', which are directed toward the central axis M, are curved with the radius of the cavity 5, in which case the hinge element 9 can easily be introduced into the cavity 5 here.

It can also clearly be seen from the side view according to FIG. 23 that the hinge element 9 has a pin 23 around which is arranged the spring element 7, which is designed as a helical spring and is supported, on the one hand, on the securing means 25 and, on the other hand, on the ring 63, which comprises the material strip 57 and the material strip 59 (which cannot be seen here).

The ring 63 is illustrated again on an enlarged scale in FIG. 24, so that the groove 65, which is introduced into the outer surface of the ring, and also the arm 99, which bears the material strip 57 and extends from the ring 63, can readily be seen here.

It can thus be seen from FIGS. 13 to 24 that, by means of the at least one protrusion 39 extending from the housing 3, and preferably two protrusions 39 and 39', a guide region 31 is formed in that the protrusions 39, 39' interact with the hinge part 15 and/or with the hinge eyelets 13 thereof and realize a rotation-prevention means which prevents relative rotation between the hinge part 15 and the housing 3.

The visible overall length of the housing 3 is determined by the length of the cavity 5. The protrusions 39 and 39' project into the region of the hinge part 15, and thus do not have an adverse affect on the overall length of the hinge, realized by the spring 100' and the hinge part 15, for a pair of glasses. This means, therefore, that the visible length of the housing 3 is not increased by the protrusions 39 and 39' because these are concealed by the hinge eyelets 13 of the hinge part 15.

Since two protrusions 39 and 39' spaced apart from the central axis M are realized here, it is possible for relatively large forces to be absorbed and thus for rotation to be avoided.

FIGS. 18 to 24 clearly show that the hinge element 9 can still be rotated before the hinge part 15 is fitted. Nevertheless, the frictional forces cause it to be rotated, to some extent, in a rotationally fixed manner in a predetermined position in the housing 3, with the result that the hinge part 15 can easily be installed on the spring hinge 100' and/or on the housing 3 thereof.

Since the protrusions 39 and 39' can project far into the hinge part 15, very good guidance of the hinge part 15 in relation to the housing 3 is achieved even in the case of overflexing. It has also been found that, as a result of the direct guidance between the two parts of the hinge, that is to say between the housing 3 and the hinge part 15, there is no longer any addition of tolerances, as was the case with the prior-art spring hinges. In the case of known hinges, the hinge element was guided in the housing and also in the hinge part. In this case, the hinge eyelets 13 of the hinge part 15 are guided directly on the housing 3, as a result of which it is possible to maintain narrow tolerances. It is has also been found here that the lever arms of the rotation-prevention means are relatively large, not only in the case of the exemplary embodiments which are illustrated in FIGS. 13 to 24, but also in the case of the other spring hinges illustrated according to FIGS. 1 to 12. In particular they are larger than in the case of polygonal guidance of the hinge element within the housing 3. As a result, that excellent guidance properties are achieved and high rotational forces can be absorbed.

Furthermore, it is possible for the rotation-prevention means to be realized cost-effectively. In the above-mentioned examples formed in accordance with the basic principle of the spring hinge according to FIG. 1, the guide region 31 can be realized by a groove introduced into the housing 3 from the outside.

In the case of the exemplary embodiments according to FIG. 13 to 24, the protrusions 39 and 39' extending from the housing 3 are easy to realize because there is no need to gain access into the interior of the housing in order for them to be produced. Rather, it is possible for the guiding elements to be realized by sawing or milling.

The invention claimed is:

1. A spring hinge for glasses wherein the glasses have a central part and side pieces, the spring hinge comprising
    a hinge element comprising at least one hinge eyelet;
    a spring device interacting with the hinge element;
    a housing containing a cavity in which at least a section of the spring device and the hinge element is arranged in a displaceable manner within the housing;
    a guide region provided in the housing for guiding the hinge element, including at least a section of the guide region which is not formed in the cavity of the housing, the housing having at least one groove which defines the at least one section of the guide region; the hinge element includes at least one protrusion arranged outside the cavity and interacting with the at least one section of the guide region of the housing, and the protrusion is located in the groove of the housing.

2. The spring hinge as claimed in claim 1, wherein the at least one section of the guide region is offset laterally in the housing in relation to the spring device.

3. The spring hinge as claimed in claim 2, wherein the groove runs essentially parallel to the displacement path of the hinge element.

4. The spring hinge as claimed in claim 1, wherein the groove runs essentially parallel to a displacement path of the hinge element.

5. The spring hinge as claimed in claim 1, wherein the hinge element has at least one region with at least one section which is assigned to the guide region.

6. The spring hinge as claimed in claim 5, wherein the region, being at least partially assigned to the guide region of the hinge element, is said at least one protrusion.

7. The spring hinge as claimed in claim 1, wherein the protrusion has a rectangular, square or circular cross section.

8. The spring hinge as claimed in claim 1, wherein the groove encloses the protrusion on three sides.

9. The spring hinge as claimed in claim 1, wherein the groove has a U-shaped cross section.

10. The spring hinge as claimed in claim 9, wherein the U-shaped cross-section of the groove includes a base and side surfaces, and at least one of the base of the groove and at least one of the side surfaces of the groove form the at least one section of the guide region.

11. The spring hinge as claimed in claim 1, wherein the groove has an outer termination.

12. The spring hinge as claimed in claim 1, further comprising a bead projecting into the cavity at a position to retain the spring in the cavity.

* * * * *